(12) United States Patent
Chowdhury et al.

(10) Patent No.: US 7,689,540 B2
(45) Date of Patent: Mar. 30, 2010

(54) COLLABORATIVE USER QUERY REFINEMENT

(75) Inventors: Abdur R. Chowdhury, Oakton, VA (US); Harmannus Vandermolen, Leesburg, VA (US); Eric Jensen, Brooklyn, NY (US)

(73) Assignee: AOL LLC, Dulles, VA (US)

( * ) Notice: Subject to any disclaimer, the term of this patent is extended or adjusted under 35 U.S.C. 154(b) by 139 days.

(21) Appl. No.: 11/613,004

(22) Filed: Dec. 19, 2006

(65) Prior Publication Data

US 2007/0266002 A1  Nov. 15, 2007

Related U.S. Application Data

(60) Provisional application No. 60/746,846, filed on May 9, 2006.

(51) Int. Cl.
 *G06F 7/00* (2006.01)
(52) U.S. Cl. .................. 707/2; 707/3; 707/5; 707/7; 702/182
(58) Field of Classification Search ............ 707/2, 707/3, 5, 7; 702/182
See application file for complete search history.

(56) References Cited

U.S. PATENT DOCUMENTS

| 6,175,829 B1* | 1/2001 | Li et al. ........................ 707/3 |
| 2004/0158559 A1* | 8/2004 | Poltorak ........................ 707/3 |
| 2006/0212265 A1* | 9/2006 | Amitay et al. ............. 702/182 |
| 2006/0248078 A1* | 11/2006 | Gross et al. .................... 707/5 |
| 2007/0162422 A1* | 7/2007 | Djabarov ....................... 707/2 |

* cited by examiner

*Primary Examiner*—Apu M Mofiz
*Assistant Examiner*—Thu Nga Nguyen
(74) *Attorney, Agent, or Firm*—Fish & Richardson P.C.

(57) ABSTRACT

A first query and a second query, both of which were submitted by a first user to identify information that satisfies a single information need of the first user, are received. The first query and the second query are stored in association with one another and based on a chronological order in which the first query and the second query were submitted by the first user to generate a first query reformulation path. A query is received from a user and more than one query reformulation path is accessed. The received query is compared with queries included in the accessed query reformulation paths to identify a relationship between the received query and a query included in a relevant query reformulation path. One or more prevalent end points is determined based on the relevant query reformulation path and at least one of the prevalent end points is presented to the user.

15 Claims, 9 Drawing Sheets

100

| User A | User B | User C |
|---|---|---|
| Madonna ←111 | Patent Office ←141 | American Idol ←171 |
| Madonna Tickets ←113 (112) | PTO ←142 | Chicago Cubs ←172 |
| Madonna Concerts | USPTO ←143 | Major League Baseball ←173 |
| Ticketmaster ←114 | USPTO Contacts ←144 | ESPN ←174 |
| Ebay ←115 | USPTO Employees ←145 | Pool Chemicals ←175 |
| Ebay Tickets ←116 | USPTO Examiner Email ←146 | Antitrust Law ←176 |
| Patent Reform ←117 | | Annapolis Summer Camp ←177 |
| Free Email ←118 | | |
| Madonna Fanclub ←119 | | |

110  140  170

COLLABORATIVE USER QUERY REFINEMENT

CROSS REFERENCE TO RELATED APPLICATIONS

This application claims the benefit of U.S. Provisional Application No. 60/746,846, filed May 9, 2006, and titled "Collaborative User Query Refinement," which is incorporated herein by reference in its entirety.

TECHNICAL FIELD

This disclosure relates to collaborative user query refinement.

BACKGROUND

The Internet enables access to large libraries of electronic content. For example, a user with a web browser may access a news site to learn about current events, or they may access a product site to research a new product. Alternatively, or to enable such access, the user may direct their web browser to a search engine for assistance in retrieving desired content.

SUMMARY

In a first general aspect, a query is received from a user. More than one query reformulation path is accessed. A query reformulation path includes at least two queries, each of the queries being submitted by a first user when seeking information that satisfies a single information need of the first user. The received query is compared with queries included in the accessed query reformulation paths. A relationship between the received query and a query included in a relevant query reformulation path is identified. One or more prevalent end points is determined based on the relevant query reformulation path. At least one of the prevalent end points is presented to the user.

With respect to at least the first general aspect, implementations may include one or more of the following features. For example, accessing query reformulation paths may include accessing a query reformulation path including at least two queries. The queries may be organized within the query reformulation path based on an order in which the queries were submitted by the first user.

Determining one or more prevalent end points may include identifying one or more queries included in the relevant query reformulation path. The one or more queries may be located at or near the end of the relevant query reformulation path. The user may be provided with the one or more identified queries as one or more suggested queries. The user may be enabled to select from among the one or more suggested queries. Search results may be presented to the user based on the selection.

Determining one or more prevalent end points may include determining search results for one or more queries included in the relevant query reformulation path and located at or near the end of the relevant query reformulation path. The search results may be provided to the user in response to the query. An indication may be received from the user that the provided search results do not satisfy the user's single information need.

The user may be provided with queries included in the relevant query reformulation path other than the one or more identified queries. The user may be enabled to select a query from the provided queries. Search results may be determined for the selected query and the user may be provided with the determined search results.

The user may be provided with queries included in the relevant query reformulation path other than the one or more identified queries. Search results may be determined for each of the provided queries. The user may be provided with a subset of the determined search results for each of the provided queries. The user may be enabled to select a query from the provided queries based on the provided subset of determined search results. The user may be provided with the determined search results for the selected query.

Identifying a relationship between the received query and a query included in a relevant query reformulation path may include determining that at least a portion of the received query relates to a higher level semantic associated with a relevant query reformulation path.

Identifying a relationship between the received query and a query included in a relevant query reformulation path may include identifying that the received query and a query included in the relevant query reformulation path are the same.

In a second general aspect, a first query and a second query are received. The first query and the second query are determined to have been both submitted by a first user. The first query and the second query are determined to have been submitted by the first user when seeking information that satisfies a single information need of the first user. The first query and the second query are stored in association with one another and based on a chronological order in which the first query and the second query were submitted by the first user. Storing the first query and the second query includes generating a first query reformulation path.

With respect to at least the second general aspect, implementations may include one or more of the following features. For example, at least one second query reformulation path may be accessed. The query reformulation path may be compared with the at least one second query reformulation path. A pattern common to the query reformulation path and the at least one second query reformulation path may be recognized. A query reformulation pattern may be generated based on the recognized pattern.

Generating a query reformulation pattern may include generating a query reformulation pattern in which at least a portion of the query reformulation pattern is related to higher level semantics. The higher level semantics may include a classification of at least one query within each of the query reformulation paths that were used to generate the query reformulation pattern, such that the query reformulation pattern may be more generic than each of its component query reformulation paths. The classification may be at least one of a geographic location, a date, or a proper name.

Determining that the first query and the second query were submitted by the first user when seeking information that satisfies a single information need of the first user may include determining if the first query and the second query are topically similar to one another. Determining that the first query and the second query are topically similar to one another may include identifying the topical similarity if the second query represents one of a query shift, a query jump, a query expand, or a query narrow from the first query.

Determining that the first query and the second query were submitted by the first user when seeking information that satisfies a single information need of the first user may include determining that the first query and the second query are related to one another based on at least one of a click-through analysis of search results associated with the queries, and a dwell analysis of web sites associated with the click-throughs of the search results associated with the queries.

Implementations of any of the techniques described may include a method or process, an apparatus or system, or computer software on a computer-accessible medium. The details of particular implementations are set forth below. Other features will be apparent from the description and drawings, and from the claims.

DETAILED DESCRIPTION

Figure 1:
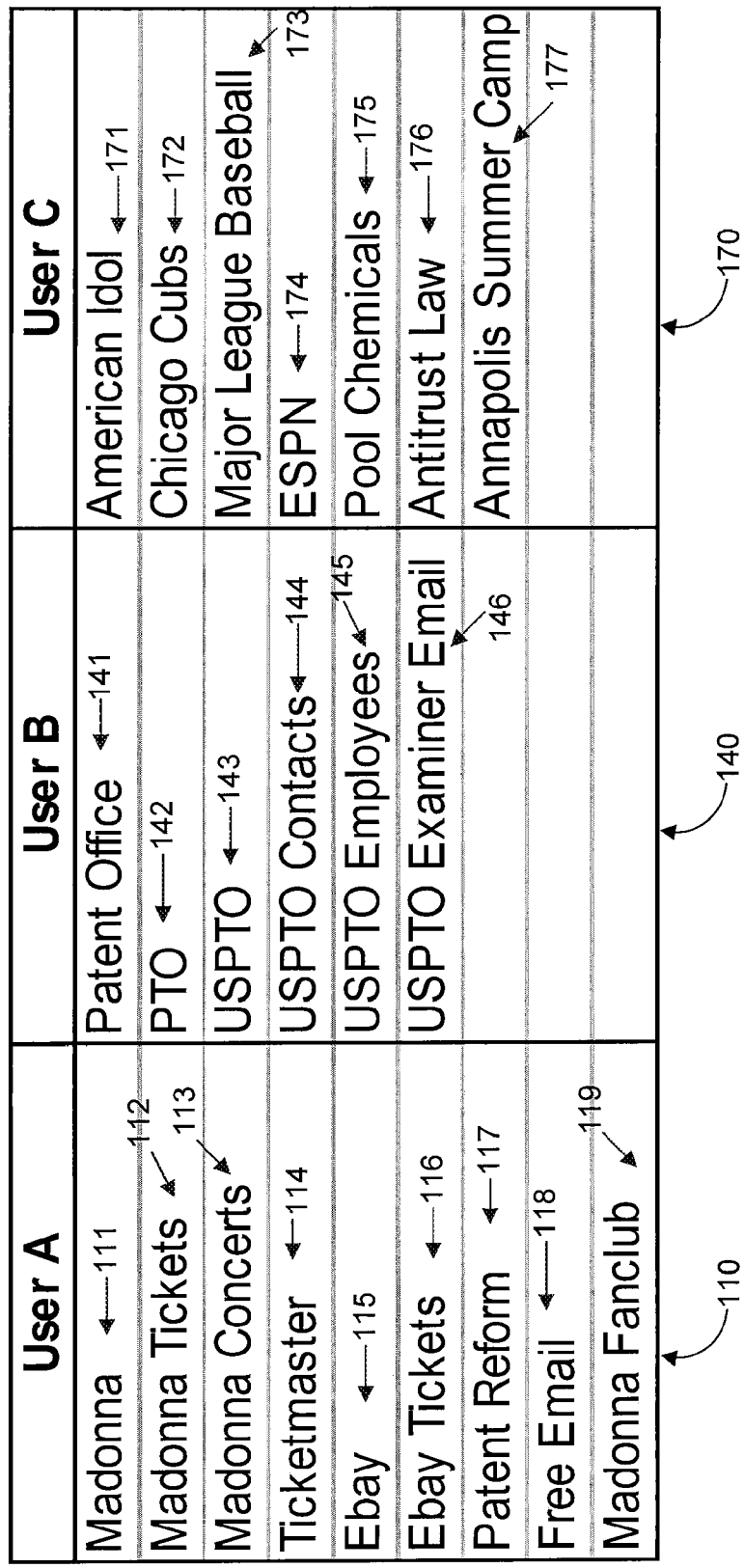
FIG. 1 shows an example of a multiparty data store that is configured to maintain information related to queries entered by users A, B, and C.

Users accessing a search engine sometimes seek content in the form of a very particular or detailed result. However, because a user does not have a large amount of information about the content the user seeks (which is why the user is seeking the content), the user may experience an inability to express enough detail in their search query that may lead the user to the particular or detailed result. This lack of information, as well as the inability to express an appropriate search query, may be referred to as a "gap" in the user's information space. In attempting to address the gap in the user's information space, the user may enter more than one query into a search engine, where each successive query is a reformulation of the prior query revised with additional or different content after being informed with results received responsive to their prior query. The user may continue to reformulate the query until the user receives search results that are responsive to the user's information need.

For example, a user enters a first query into a search engine and examines (e.g., visually reviews or selects) search results provided in response to the first query. Upon determining that the search results are not fully responsive to the user's information need, and thus indicating that an information gap exists (or continues to exist), the user enters a second query in an attempt to retrieve more responsive search results. The second query represents a reformulation of the first query. The user will continue to reformulate queries and examine search results until a particular set of search results provide information sufficient to satisfy the user's information need.

Techniques are described for determining when a user is proceeding along a query reformulation path. As such, the search engine may be configured to determine when successive queries provided by a particular user are related to one another. A relationship between successive queries may be based on whether the queries have words in common. For example, the query "television" and the query "television sales" may be related because both queries include the word "television." In another example, the query "American cheese" and the query "American Idol" may be related because the queries both include the word "American." However, even though both sets of queries have a word in common, the first set of queries relate to the same subject matter (e.g., television sets and sales of television sets), while the second set of queries may not be subject matter related to a user's query objective (e.g., American cheese is a type of food and American Idol is a television show, and, as such, if the user is seeking information related to television content, then only the "American Idol" query is relevant). Thus, the subject matter or content to which the queries relate also may be taken into account when determining if two queries are related, and thus deemed to be part of a single query reformulation session.

Once it is determined that a particular set of queries is part of a single query reformulation session, a query reformulation path may be generated for the queries. A query reformulation path includes queries that have been determined to be topically related to one another in the order that a user submitted the queries to a search engine. Additionally, and in some implementations, a query reformulation path may include "queries" that could have been (but were not actually) provided by the user in between two queries actually provided by the user. For example, if a user provides the queries "Madonna" and "Madonna Ticketmaster," it may be automatically determined that the user could have provided the query "Madonna Tickets" in between the "Madonna" and "Madonna Ticketmaster" queries, and thus, the query "Madonna Tickets" may be inserted into the query reformulation path between the user-provided queries.

Query reformulation paths, once generated, may be stored and later resurrected or otherwise used to close the information gap of future query submitters when they enter queries into a search engine that are determined to be related to a known query reformulation path. For example, the search engine may use the stored query reformulation path to suggest an alternate query for a user who has entered a query that is deemed to be related to a query reformulation path to which the alternate query belongs. Alternatively, the search engine may provide search results to the user based on the query reformulation path that the user is believed to be following. Suggesting a query reformulation (or providing search results based on the query formulation path) may address the user's information gap so that the user may retrieve search results responsive to the user's interest, even if the user is unable to articulate one or more terms in a query that are useful in leading to search results responsive to the user's predicted interest.

As such, this application describes presenting information to a user. A data store may be generated to include information related to multiparty queries that are received from more than one user. At least some of the multiparty queries may be associated with a particular user and the multiparty queries associated with the particular user may be identified as queries. It then may be determined whether the queries represent a query reformulation session, and, if so, a query reformulation path associated with the query reformulation session may be generated.

Multiparty data store 100 of FIG. 1 is configured to maintain information related to queries 110, 140, and 170 entered by users A, B, and C, respectively. Multiparty data store 100 is used to determine if a sequence of queries received by a search engine represents a query reformulation session (and thus can be used to generate a query reformulation path). The concept of a query reformulation session, as described, may be valuable if a user who entered particular queries is known. This is the case because query reformulation depends on a particular user's information need and a series of reformulated queries entered by the particular user in an attempt to retrieve information that satisfies the particular user's information need. Thus, in general, a query reformulation session may only exist among queries entered by a single user. In some instances, however, more than one user may be working together to find information to satisfy a single information gap held by the group of users. As such, queries entered by each of the more than one user may be part of a single query reformulation session and thus those queries entered by all of the users may be considered when determining if a series of queries represents a query reformulation path.

In either case, queries entered into a search engine by multiple users may be stored in multiparty data store 100, along with an association between a particular query stored in the multiparty data store 100 and a particular user who entered the particular query. More particularly, multiparty data store 100 includes an association between users A, B, and C and various queries 110, 140 and 170 entered by each of the users A, B, and C, respectively.

The queries 110 associated with user A relate to interest in Madonna concert tickets. User A first enters the query 111 "Madonna" into a search engine. Upon receiving search results associated with the query 111 for the term "Madonna," the user determines that the search results are too generic and not responsive to the user's interest in concert tickets. Thus, the user reformulates the query and enters a query 112 "Madonna Tickets." The relationship between query 111 and query 112 may be referred to as a query narrow because the user has added terms to the first query and maintained all terms in the first query in an attempt to retrieve more responsive search results. By adding more terms to the user's query, the user is narrowing the universe of search results that may be returned in response to the new query. If the search results associated with query 112 "Madonna Tickets" are still not responsive to the user's information need, such as, for example, if the search results relate to parking tickets received by the singer rather than concert tickets, the user continues to reformulate the query. As shown, the user enters the query 113 "Madonna Concert Tickets." Query 113 also may be referred to as a query narrow, this time of query 112, in that the user has again increased the number of query terms and all of the query terms in query 112 are maintained in query 113.

Assuming that the search results provided in response to query 113 are still not responsive to the user's information need, the user enters the query 114 "Tickets." The query may be referred to as a query expand because the user has decreased the number of terms upon moving from the query 113 to the query 114 and all the terms in query 114 are present in query 113. Decreasing the number of terms in the user's query has the effect of expanding the universe of search results that may be presented to the user since there are fewer constraints on the user's query.

If none of the queries 111-114 provide search results that are responsive to the user's information need, the user may adopt another approach. For example, user A enters a query 115 with the term "Ticketmaster." Query 115 may be referred to as a query jump in that the user has "jumped" to a new strategy to retrieve search results that fill the user's information need. More precisely, although query 114 and query 115 are topically related (e.g., Ticketmaster sells concert tickets), query 115 has no terms in common with any of queries 111-114. Similarly, the query 116 "Ebay" also represents a query jump, as queries 115 and 116 do not share any terms, although both queries are related to websites that sell concert tickets.

Assuming that the user has still not received any satisfactory search results, user A narrows query 116 by entering the query 117 including the terms "Ebay Tickets." In query 117, the user added a term to the query 116 while maintaining all of the search terms in query 116, and thus query 117 represents a query narrow of query 116.

In the present example, although the user seeks information on Madonna concert tickets, the user may be distracted from this task and may perform a search for information related to "Patent Reform" by entering the query 118. Query 118 represents a query jump as the queries 117 and 118 do not share any terms. However, in this instance, query 118 is not topically similar to query 117, and thus, is probably not related to the same query reformulation session as queries 111-117. Similarly, query 119 for "Free Email" also represents a query jump and does not appear to be topically related to queries 111-117 or query 118. As such, the query 119 also may be deemed to not be a part of the query reformulation session that includes queries 111-117.

The user A seems to return to the query reformulation session upon entering the query 120 with the terms "Madonna Fanclub." The query 120 represents a query jump from query 119 because queries 119 and 120 do not share any terms. However, query 120 also may represent a query narrow with respect to query 111 with the term "Madonna" because user A has added terms to query 111 in an apparent attempt to retrieve more responsive search results. Additionally, query 120 with the terms "Madonna Fanclub" may be referred to as a query shift with respect to the query 112 "Madonna Tickets." A reformulated query may represent a query shift when both the current and prior queries share at least one term and not all of the terms in the prior query appear in the current query, as is the case with query 112 and query 120. However, in this example, the query 112 and the query 120 may be determined to be related to one another, and thus part of the same query reformulation session, because the queries seem to relate to the same subject matter, i.e., the singer Madonna. However, in another example, a query reformulation from a first query of "American Cheese" to a second query of "American Idol" may represent a query shift in that the two queries have a term in common, but the two queries may not belong to the same query reformulation session because the first query relates to food and the second query relates to a television program.

Based on the relationships between queries 111-119, it may be determined that queries 111-116 and query 119 are included in the same query reformulation session. As such, a query reformulation path may be generated that includes queries 111-116 and 119 in the order that the queries were provided by the user A.

User B 140 seeks information related to contact information for a person (e.g., a patent examiner) who works at the United States Patent and Trademark Office. User B first enters the query 141 "Patent Office." Upon receiving search results associated with query 141, user B determines that the search results are too generic by including, for example, search results related to patent offices in foreign countries. Thus, user B reformulates the query and enters query 142 with the acronym for Patent and Trademark Office, "PTO." The query 142 represents a query jump from the query 141 because queries 141 and 142 do not share any terms. However, the two queries may still be a part of the same query reformulation session because they are topically related to the Patent Office.

Assuming that the search results provided for the query 142 are not satisfactory, user B narrows the scope of query 142 by providing query 143 "USPTO," which represents the full acronym for the United States Patent and Trademark Office. In some implementations, the query 143 may be deemed to be related to query 142 as a query narrow because the term "PTO" is included in both queries 142 and 143 and query 143 includes the additional term "US." However, in some implementations, the "word" "PTO" may be determined to be a different "word" from "USPTO," and thus the relationship between queries 142 and 143 may be referred to as a query jump because no "words" are common to both queries. However, the two queries in this scenario may still be deemed to be part of the same query reformulation session because of the topical similarity between the truncated acronym "PTO" of query 142 and the full acronym of "USPTO" of query 143 as both being related to the United States Patent and Trademark Office.

The search results provided for the query 143 still may not provide the user with the information that the user seeks. As such, the user enters query 144 with the terms "USPTO Contacts." Query 144 represents a query narrow of query 143 "USPTO." The user subsequently enters query 145 with the terms "USPTO Employees," which represents a query narrow with respect to query 142 "USPTO" because queries 142 and 145 share a word in common "USPTO" and the later query 145 includes more terms than query 142. Query 145 also represents a query shift with respect to query 144 "USPTO Contacts" because queries 144 and 145 share at least one term. Similarly, query 146 includes the terms "USPTO Examiner Email," representing a query shift with respect to query 145 because both queries 145 and 146 include the term "USPTO" though not all of the terms appearing in query 145 are included in query 146.

As such, in some implementations, because there is a topical relationship among all of the queries provided by user B, each of queries 141-146 may be determined to be a part of a single query reformulation session. The queries 141-146 may be used to generate a query reformulation path.

User C seeks information related to multiple subject areas. User C first enters the query 171 that includes the term "American Idol." The user C is satisfied with the search results provided in response to query 171, and, as such, decides to search for information related to another subject of interest. Because query 172 "Chicago Cubs" does not have any words in common with query 171, query 172 represents a query jump. Similarly, query 173 "Major League Baseball" also represents a query jump from both queries 171 and 172, as none of the queries share any terms. One difference, however, is that queries 171 and 173 are not topically related, whereas queries 172 and 173 are topically related, as the Chicago Cubs is a team in Major League Baseball. Query 174 includes the term "ESPN" and represents a query jump that is topically related to queries 172 and 173 because the cable network ESPN includes news coverage of Major League Baseball. Finally, queries 175 "Pool Chemicals," 176 "Antitrust Law," and 177 "Annapolis Summer Camp" all represent query jumps that are not related to any of the previous queries.

As such, of all the queries 171-177 provided by user C, queries 172-174 are the only ones that seem related, and as such, are determined to be included in the same query reformulation session. The queries 172-174, therefore, may be used to generate a query reformulation path.

The queries in data store 100 have been associated with a particular user (user A, B, or C). The association of a query with a particular user may be performed using identification information associated with the user who entered each query. The identification information may include, for example, the Internet Protocol (IP) address of a system being used by a particular user at the time the user entered the query, login identification information of the user, or a Hypertext Transfer Protocol (HTTP) cookie.

The queries shown in data store 100 may be analyzed to identify query reformulation paths. A user may enter successive and reformulated queries in an attempt to retrieve search results that address an information gap. The sequence of reformulated queries may be referred to as a query reformulation session and the particular queries entered during the query reformulation session may be referred to as a query reformulation path.

More precisely, a query reformulation path may represent a sequence of queries entered by a user from a first query that did not provide search results responsive to the user's information gap to an Nth query that did provide search results responsive to the user's information gap, where the user enters N-2 queries between the first and last (Nth) queries. The first query in a query reformulation path may be referred to as a starting point or starting query, and the last query in a query reformulation path may be referred to as an end point or an end query. Establishment of a user's "location" with respect to the query formulation path may be used to advance a user to the end point (or end query or search results associated with the end query), thereby enabling a user to more quickly and easily receive search results that are responsive to the user's information gap.

In the example of user A, queries 111-117 are determined to be part of a query reformulation session because the queries 111-117 are topically similar to one another and/or represent a shift, narrow, expand or jump of one another. Initially, query 116 of "Ebay" is not determined to be topically similar to queries 111-115 because "Ebay" is not generally associated with concert tickets. But, subsequent analysis of query 117, which includes the phrase "Ebay Tickets," may be used to relate queries 116 and 117 to queries 111-115 and, as a result, queries 116 and 117 are included in the query reformulation session of user A. Query 120 also may be deemed to be a member of the query reformulation session of queries 111-117 if the system performing the query analysis has access to outside information, such as, for example, information that some Tower Records stores include Ticketmaster outlets, and thus sell concert tickets. However, if access to this type of information is not readily available, there may not be a way to determine that query 120 is, or should be, part of the query reformulation session of queries 111-117.

As described above, because queries 118, 119, and possibly 120, are not topically related to queries 111-117, the queries are not identified as members of the query reformulation session. However, if query 120 is determined to be related to queries 111-117, a query reformulation session may include queries 111-117 and 120, and as such, a query reformulation path associated with the query reformulation session may include all of the queries entered by user A, except queries 118 and 119.

In another example, topical similarity may be determined, at least in part, based on a time frame in which the queries are entered by a user. For example, terms that may or may not be topically related may be deemed to be topically related if the terms were provided by a user in close chronological proximity to one another. In addition, two terms that do not seem topically related to one another, but are each topically similar to other terms that were provided by a user during a particular time frame, also may be deemed to be topically related.

In some implementations, a subject matter relationship between queries need not be based solely, or at all, on a time frame in which the queries were entered by the user. Topical similarity may be defined based on information included in a predetermined list of terms, higher level semantic, classification or ontology scheme, which may be initially created, for example, by a human editor (e.g., an administrator), and may be improved by, for example, a machine learning algorithm. For example, an administrator may include all terms associated with the topic of "tickets" in a list. If a user enters a query including one of those terms, the query is determined to be topically related to the topic of "tickets." A second query entered by the user including the same or another term in the list also may be determined to be related to the topic of "tickets." Once all of a user's queries have been analyzed, the queries related to the topic of "tickets" may be identified as belonging to a "tickets" query reformulation session.

The predetermined list may expand itself such that the terms provided by an administrator for each topic serve as seeds for the automated determination of other terms associated with the topics. An automated application may determine additional terms associated with each topic based on an analysis of past queries and other information, such as consultation of web pages, taxonomies, ontologies, and/or user feedback.

Topical similarity may further be based on other contextual information provided with the queries or surrounding the queries, such as, for example, user profile information or recent browsing history of a user. For example, a user may enter a first query "Madonna" and a second query "tickets." Alone these queries do not seem to be topically similar. However, if prior to providing the queries, for example, the user accessed a web page entitled "Buy Madonna Concert Tickets Here!," the information that the user is searching for Madonna concert tickets may be used to aid in determination of whether the first and second queries actually are topically similar. In another example, if the user has provided profile information that includes a list of all Madonna concerts, and a picture of a ticket from each, attended by the user in the past five years, the information that the user has an interest in Madonna concerts and Madonna concert tickets also may be used to identify a relationship between the first and second queries.

Additionally, analysis of click-throughs of search results and dwell times at web pages or websites associated with search results for a particular query in the series of queries also may aid in the determination that the query is part of a query reformulation session in a similar fashion.

Once a query reformulation session has been identified, and the queries that belong thereto determined, a query reformulation path may be generated. In the example shown for user A 110, queries 111-117 and 120 represent a query reformulation path such that the starting point of the query reformulation path is query 111 with the term "Madonna," the end point is query 120 with the phrase "Tower Records," and queries 112-117 are midpoints within the query reformulation path. As described above, intermediate queries may be automatically added to the query reformulation path. For example, the query "Ebay Madonna Tickets" may be added between query 116 "Ebay tickets" and query 120 "Tower Records."

An end point of a query reformulation path is the last query in the query reformulation path, which is deemed to have addressed user A's information gap because the user did not enter any additional queries that were topically related to the previous queries. As such, the end point of "Tower Records" in the query reformulation path may be deemed to address a future user's information gap if the future user enters a query that is the same as, or similar to, any one of queries 111-117, which indicates that the user is on the query reformulation path that ends with "Tower Records."

In another example of a query reformulation path, it may be determined that the queries 171-177 are not sufficiently related to constitute a query reformulation session. However, the data store 100 may continue to monitor the query submissions from user C to determine if any of the terms in queries 171-177 represent starting points (or locations related to an early query formulation path) in a query reformulation path.

In one implementation, data store 100 represents a history of queries maintained by a search engine. In another implementation, data store 100 represents a configuration file. In still another implementation, data store 100 may represent a GUI that is presented to a search administrator for further analysis and manual configuration of query reformulation paths. For example, the contents of data store 100 may be rendered in a GUI with a request to a search administrator to generate a programming construct that configures the search engine to use a configuration specified in the programming construct when queries related to the contents of data store 100 are received.

Figure 2:
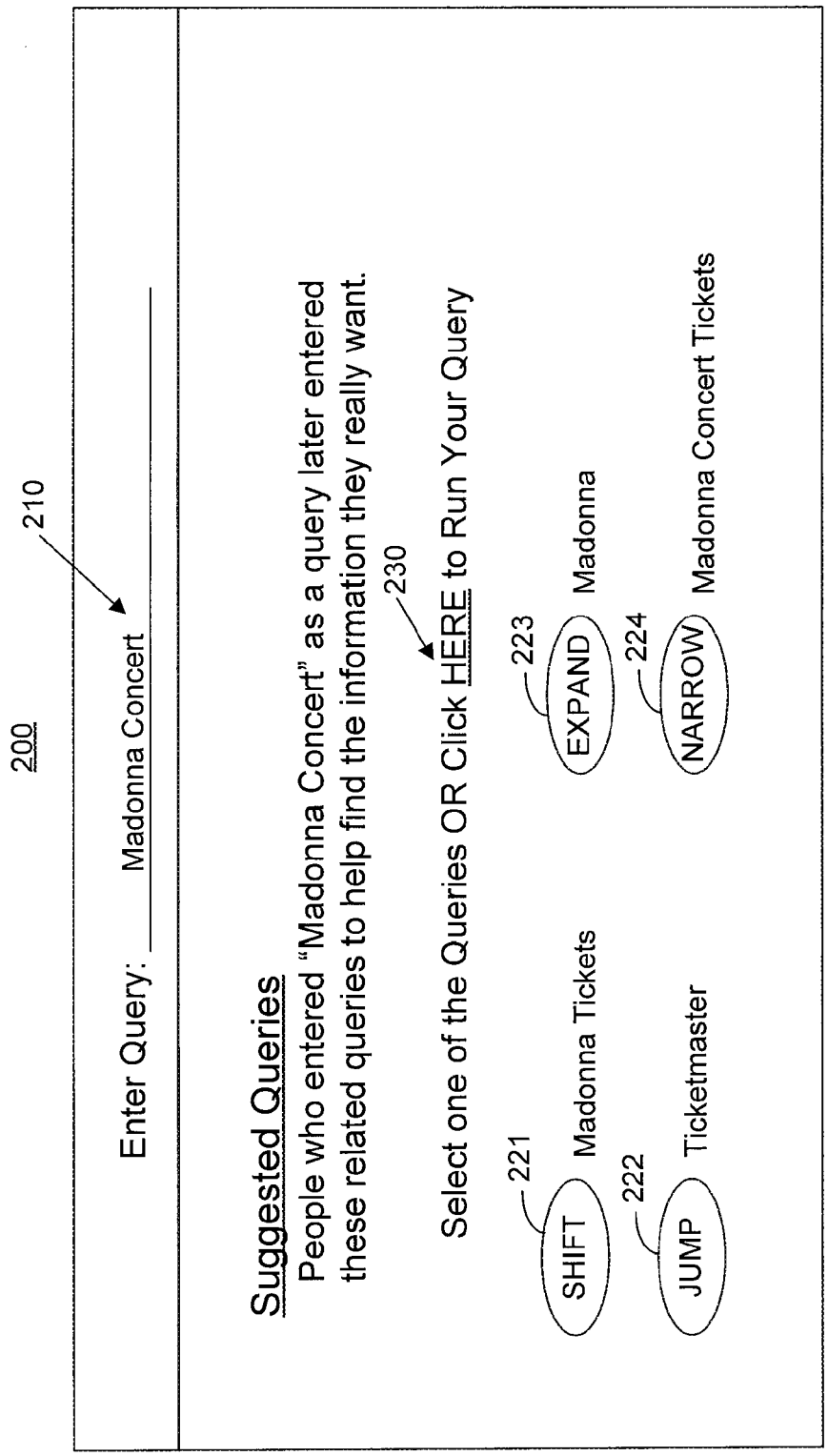
FIG. 2 shows an example of a graphical user interface (GUI) that illustrates displaying suggested queries to a user after the user has entered the query "Madonna Concert."

GUI 200 of FIG. 2 illustrates displaying suggested queries to a user after the user has entered the query "Madonna Concert." The GUI 200 includes an input field 210, which shows that a user has entered the query "Madonna Concert." It is determined that the query "Madonna Concert" is a start point, or an early point, in one or more query reformulation paths. As such, other queries that belong to the one or more query reformulation paths (e.g., end points) may be provided to the user via GUI 200. In another example, although not shown here, search results corresponding to end points in the one or more query reformulation paths may be provided to the user via GUI 200 in addition to, or in stead of, providing end queries.

To provide suggested queries to the user, GUI 200 indicates that other users who entered the query "Madonna Concert" later entered additional queries that returned search results that were more responsive to the other user's interest. The additional queries represent a query shift "Madonna Tickets" 221, a query jump "Ticketmaster" 222, a query expand "Madonna" 223, and a query narrow "Madonna Concert Tickets" 224 relative to the user's query "Madonna Concert." The queries 221-224 may be determined, and provided to the user, based on, for example, the query reformulation session of user A described with respect to FIG. 1. The user may select one or more of the queries 221-224 to retrieve search results that are more responsive to a user's interest. If the user decides to continue with the query without modifying the query based on a query reformulation path, the GUI 200 enables the user to run the user's query as it was entered by clicking on the word "here" 230.

In some implementations, the queries 221-224 may be provided to the user without any indication of a relationship between the queries and the user's query (e.g., a query shift).

If a particular pattern is recognized to exist among a threshold number of query reformulation paths, a generalized query reformulation path based on the pattern may be generated. In one implementation, all queries within a query reformulation path that fits the pattern, or a portion of queries within the path, may be matched to higher level semantic, or a classification or ontology scheme. For example, the query reformulation path to which the queries 143-145 belong is recognized as including a reference to the U.S. Patent and Trademark Office (USPTO). The USPTO may be associated with the higher level semantic or class of "government agency." Other higher level semantics or classifications may be based on, for example, a geographic location, a date, or a proper name. Therefore, query 143 of "USPTO" is generalized to "[government agency]" and, correspondingly, query 144 of "USPTO Contacts" is generalized to "[government agency]+contacts," and query 145 of "USPTO Employees" is generalized to "[government agency]+employees." Notably, and in some implementations, it may first be determined that other words included in a query along with the generalizable word is a generic word that applies to all possible members of the class to which the generalizable word has been associated. For example, the words "contacts" and "employees" are generic words that may relate to all government agencies. However, the word "examiner" as included in query 146 is a word that is specific to the USPTO, and as such, may not be included as a query that is part of a generalized query reformulation path. As such, the generalized query reformulation path includes "[government agency]" to "[government agency]+contacts" to "[government agency]+employees." Other query reformulation paths that relate to the generalized query reformulation path described above may include references to the Federal Food and Drug Administration, the Department of Education, and the Internal Revenue Service, all of which, including the U.S. Patent and Trademark Office, are government agencies.

Figure 3:
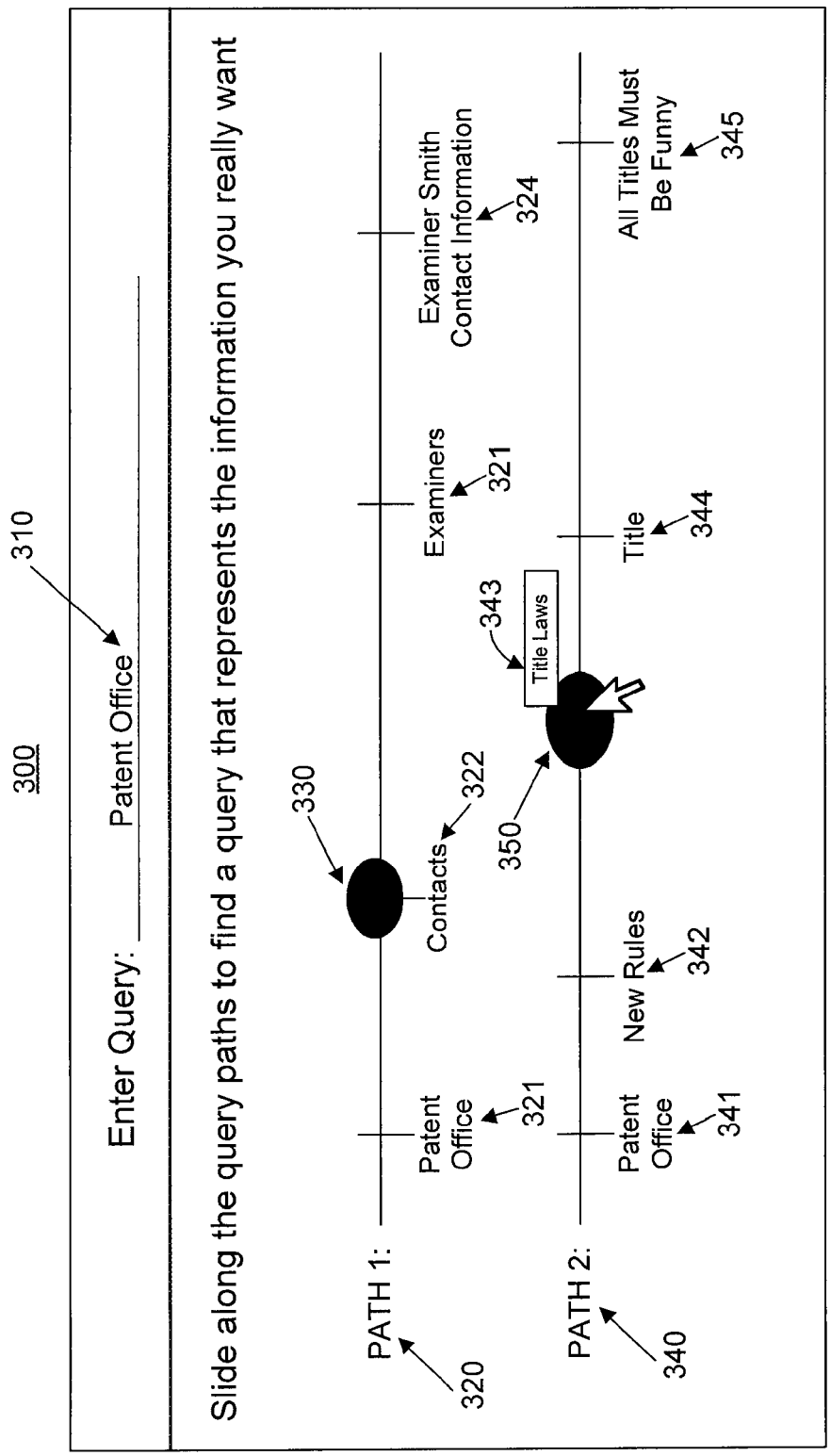
FIG. 3 shows an example of a GUI that illustrates providing a query reformulation path related to a user's query.

GUI 300 of FIG. 3 illustrates providing a query reformulation path related to a user's query. The user has initially entered the query "Patent Office," as shown at element 310. The query "Patent Office" may be determined to be a starting point for at least two query reformulation paths: path 1 320 and path 2 340. The GUI 300 may provide the user with all, or a subset of, the queries that define the two query reformulation paths 1 and 2. More particularly, GUI 300 provides query reformulation path 1 320 that, in addition to the starting point query "Patent Office" 321, also includes the queries "Contacts" 322, "Examiners" 323, and "Examiner Smith Contact Information" 324 In addition, GUI 300 also provides query reformulation path 2 340 that, in addition to the starting point query "Patent Office" 341, also includes the queries "New Rules" 342, "Title" 344, and "All Titles Must Be Funny" 345 The query reformulation paths 1 and 2 may add or delete information to a query reformulation path (e.g., adding a query in between two queries in a query reformulation path) or may add or delete information related to a particular query (e.g., displaying query 322 as "Contacts," when the query entered by a user during path 1 was actually "USPTO Contacts" or "Patent Office Contacts," since it may have been determined that including these additional words is unnecessary to convey the meaning of the query to the user).

The user may select any one of the queries within either query reformulation path 1 or 2 by moving a slider control, such as, for example, slider controls 330 and 350. By positioning one of the slider controls 330 or 350 directly above a query on a query reformulation path, the user may receive search results corresponding to that query. If the user moves one of the slider controls 330 or 350 to a position in between two queries, then, in one implementation, the search results may be based on a query in the query reformulation path that exists between the two queries, but is not presented in the GUI 300. For example, a user moved the slider 350 to a position in between query 342 "New Rules" and query 344 "Title." A query "Title Laws" 343 may be shown to a user in, for example, a pop-up window or bubble, as a query that exists in the query reformulation path 2 340 in between queries 342 and 344. The query "Title Laws" may be a query provided by the user who generated the query reformulation path 2 340 or may have been generated automatically as a query that is likely to exist in between the queries "New Rules" 342 and "Title" 344. By placing the slider control 350 at the location shown in GUI 300, the user may receive search results associated with the query "Title Laws" 342.

In another implementation, if the user positions one of the slider controls 330 or 35 in between two queries, the most relevant search results for both queries may be combined and presented to the user. For example, the search results for each query may be presented alternatively to the user with the most relevant search result of the first query followed by the most relevant search result of the second query followed by the second most relevant search result of first query and so on. In another implementation, the search results retrieved in response to both of the queries may be presented to the user ahead of search results retrieved in response to only the first or second query. Once the overlapping search results are presented to the user, the remaining search results may then be presented alternatively, similar to the prior implementation.

Figure 4:
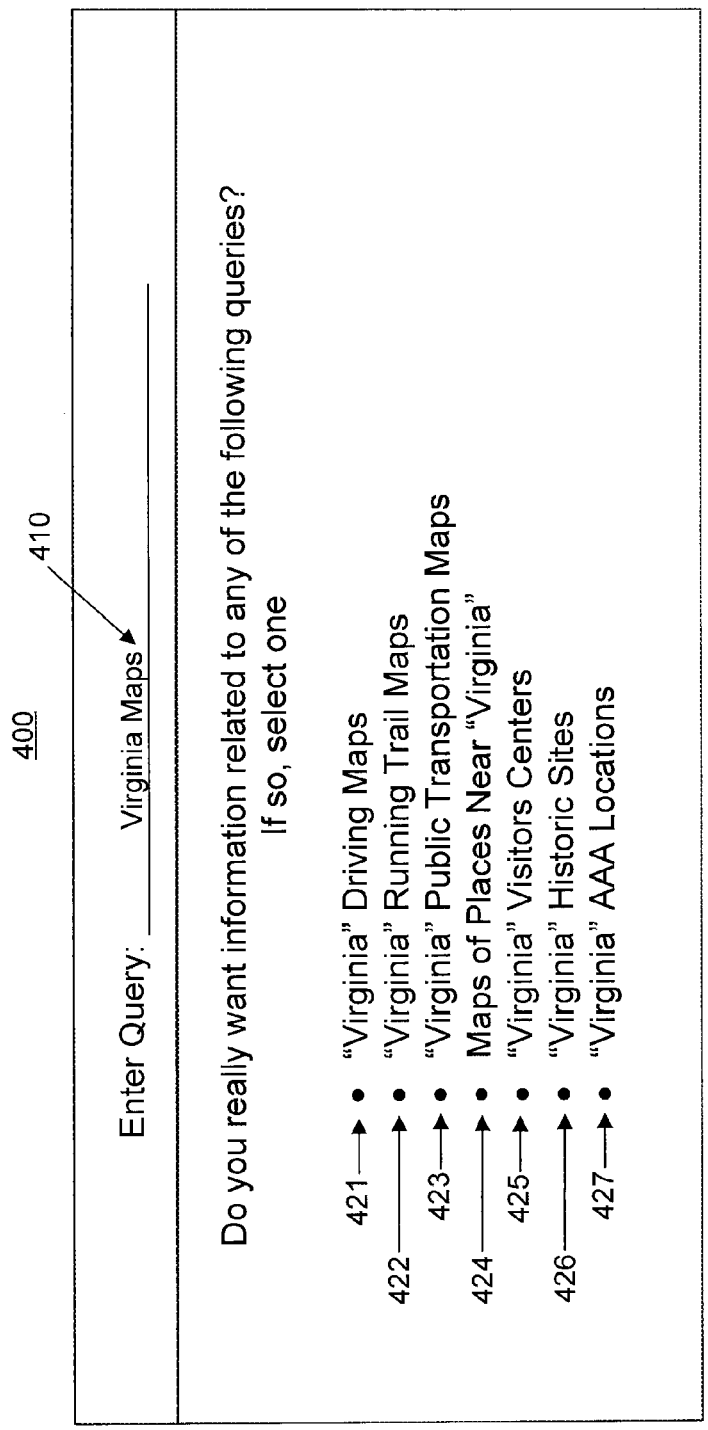
FIG. 4 shows an example of a GUI that illustrates providing suggested queries to a user based on a pattern of query reformulation paths.

GUI 400 of FIG. 4 illustrates providing suggested queries to a user based on a pattern of query reformulation paths. The user enters the query "Virginia Maps," as shown at element 410. The query "Virginia Maps" may be recognized as belonging to a pattern of query reformulation paths defined by "[geographic location]+maps."

More than one end point associated with a query starting point of "[geographic location]+maps" may be identified. As such, GUI 400 provides a user with the identified end points for query reformulation paths having this starting point. More particularly, GUI 400 provides the user with the query 421 "Virginia Driving Maps," query 422 "Virginia Running Trail Maps," query 423 "Virginia Public Transportation Maps," query 424 "Maps of Places Near Virginia," query 425 "Virginia Visitors Centers," query 426 "Virginia Historic Sites," and query 427 "Virginia AAA Locations."

In some implementations, all of the identified query end points may be presented to the user. Alternatively, only a subset that constitutes the most prevalent end points, e.g., the query that is most often found as an end point of a query reformulation path having as a starting point "[geographic location]+maps," may be provided by GUI 400. The user may select one of the end points 421-427 for which to retrieve search results that are sufficient to address the gap in the user's information space.

Figure 5:
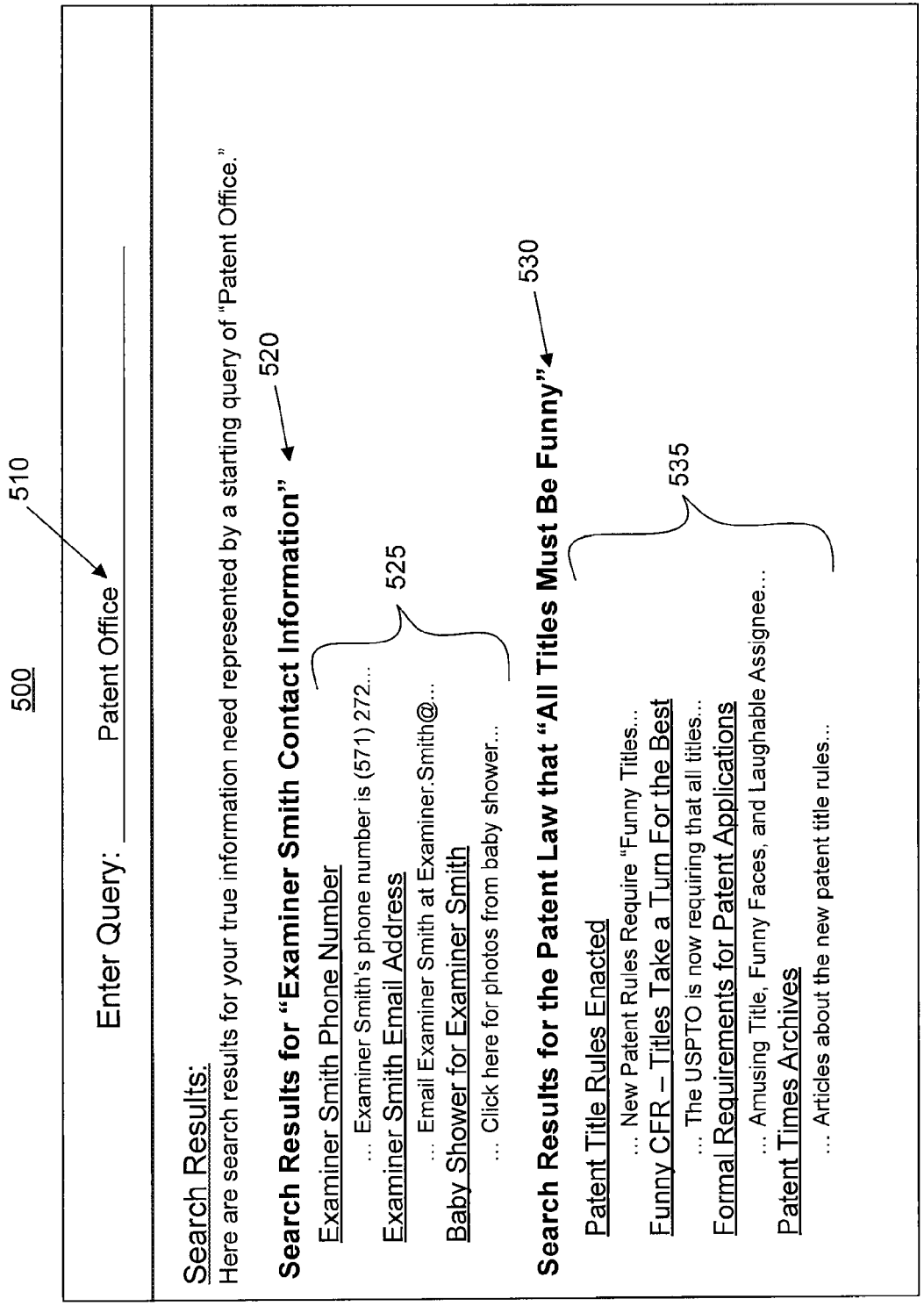
FIG. 5 shows an example of a GUI that illustrates displaying search results to a user that correspond to queries in a query reformulation path.

GUI 500 of FIG. 5 illustrates displaying search results to a user that correspond to queries in a query reformulation path. The user provides the query "Patent Office," as shown at element 510. The query "Patent Office" may be determined to belong to (e.g., be a starting point of) two query reformulation paths, such as, for example, path 1 320 and path 2 340 of GUI 300. As such, the end points for the two query reformulation paths are the queries "Examiner Smith Contact Information," and "All Titles Must be Funny," respectively.

Instead of providing the user with suggested queries based on query reformulation paths to which the user-provided query is identified as belonging, GUI 500 illustrates displaying search results that correspond to queries within (e.g., at the end points of) the identified query reformulation path. As such, GUI 500 provides search results to the user for two queries that are end points of the two query reformulation paths identified as starting with the query "Patent Office." More particularly, GUI 500 provides search results 525 that correspond to, and provide information about, the query "Examiner Smith Contact Information" 520. For example, the search results 525 provide a phone number, email address, and baby shower photos for Examiner Smith. GUI 500 also provides search results 535 that correspond to, and provide information about, the query "All Titles Must be Funny" 530, which is associated with a patent law, as indicated by GUI 500. For example, the search results 535 provide several articles that discuss a new patent law that requires that all titles of patent applications must be "funny."

Figure 6:
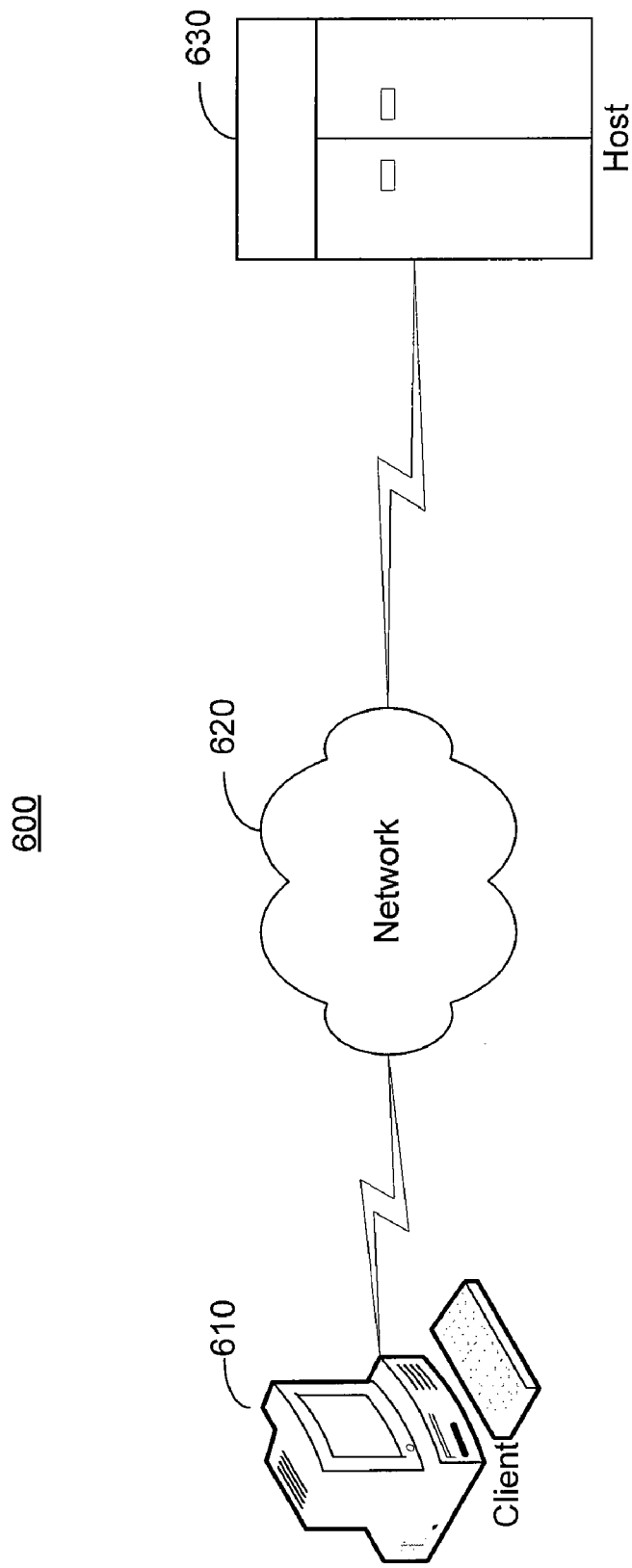
FIG. 6 shows an example of a communications system that includes a host configured to generate a query reformulation path for a client based on a query.

Communications system 600 of FIG. 6 includes a host 630 configured to generate a query reformulation path for a client 610 based on a query. Each of the client 610 and the host 630 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 610 and host 630 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 610 or the host 630.

The client 610 may include one or more devices capable of accessing content on the host 630. The host 630 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 610 includes one or more information retrieval software applications (e.g., a browser, a mail application, an instant messaging client, an Internet service provider client, a media player, or another integrated client) capable of receiving one or more data units. The information retrieval applications may run on a general-purpose operating system and a hardware platform that includes a general-purpose processor and specialized hardware for graphics, communications and/or other capabilities. In another implementation, the client 610 may include a wireless telephone running a micro-browser application on a reduced operating system with general purpose and specialized hardware capable of operating in mobile environments.

More particularly, client 610 may be configured to receive information related to a user's query or receive a query from a user and provide the query to host 630. The user may enter terms related to the user's query through one or more GUIs displayed by client 610. The information related to the query may be provided by the user upon being presented with a GUI that includes an input field to enter terms related to the query. The user may be presented with alternative or additional terms related to the query and may select to include those terms in the query. The user may also be presented with a slider control that allows a user to select alternative or additional terms to include in the query. This process may be iterative such that the user may be provided with alternative or additional terms after entering an initial query.

Client 610 may be configured to receive from host 630 search results that include, for example, documents or other information that are responsive to the query. Client 610 may be configured to present the search results to the user by displaying the search result images in a GUI. The GUIs may be rendered on client 610 by, for example, a software program or an Internet webpage. In some implementations, the GUIs may relate to an online search engine.

The network 620 includes hardware and/or software capable of enabling direct or indirect communications between the client 610 and the host 630. As such, the network 620 may include a direct link between the client 610 and the host 630, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 630 generally includes one or more devices configured to receive a query and return search results determined to be responsive to the query. Typically, a host 630 includes similarity information related to the query. The host 630 may include a general-purpose computer having a central processor unit (CPU), and memory/storage devices that store data and various programs such as an operating system and one or more application programs. Other examples of a host 630 includes a workstation, a server, a special purpose device or component, a broadcast system, other equipment, or some combination thereof capable of responding to and executing instructions in a defined manner. The host 630 also may include an input/output (I/O) device (e.g., video and audio input and conversion capability), and peripheral equipment such as a communications card or device (e.g., a modem or a network adapter) for exchanging data with the network 620.

The host 630 is generally capable of executing instructions under the command of a controller. The host 630 may be used to provide content to the client 610. The controller may be implemented by a software application loaded on the host 630 for commanding and directing communications exchanged with the client 610. Other examples of the controller include a program, a piece of code, an instruction, a device, a computer, a computer system, or a combination thereof, for independently or collectively instructing the client 610 or the host 130 to interact and operate as described. The host 630 may be embodied permanently or temporarily in any type of machine, component, physical or virtual equipment, storage medium, or propagated signal capable of providing instructions to the client 610 or the host 630.

Host 630 may be configured to receive a query from a user. Host 630 also may be configured to generate and store similarity information based on the query. The similarity information may be used to determine search results that are responsive to the query. Host 630 may be configured to provide to client 610 documents or other information that include the query terms.

Figure 7:
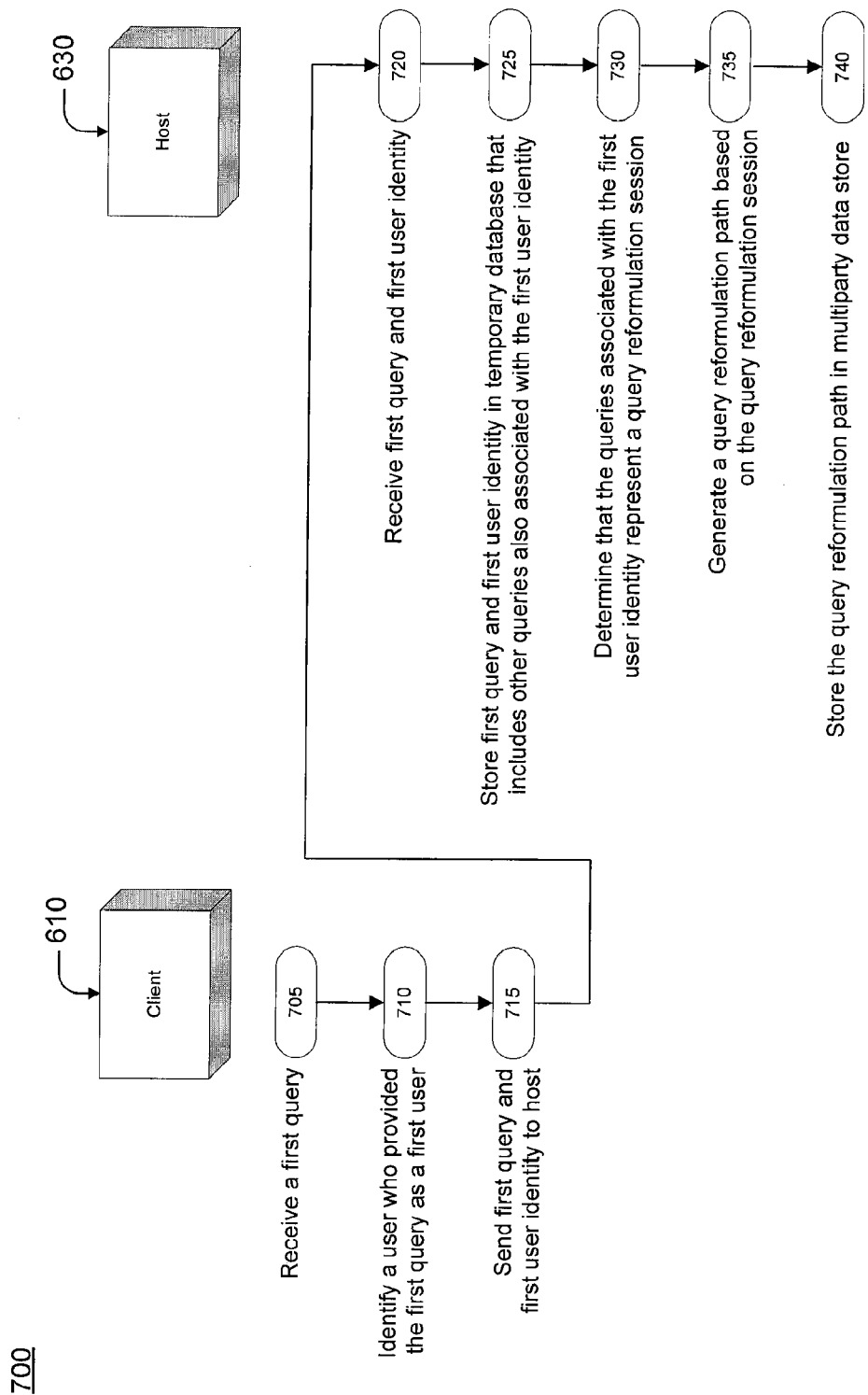
FIG. 7 shows an example of a flow chart of a process by which a query reformulation path is generated and stored.

A flow chart 700 of FIG. 7 shows a process by which a query reformulation path is generated and stored. The query reformulation path may be generated and stored, for example, by the system described with respect to FIG. 6. For instance, the process of flow chart 700 may be performed by the client 610 and the host 630 of FIG. 6.

Client 610 receives a first query (705). For example, the client 610 receives the query "Madonna Concerts." Client 610 identifies a user who provided the first query as a first user (710). The identification information may include, for example, the Internet Protocol (IP) address of the system a user uses to enter the query, login identification information of the user (e.g., a screen name), and/or a Hypertext Transfer Protocol (HTTP) cookie. In the present example, the first user who provided the query "Madonna Concerts," is associated with a screen name MadgeFan. Client 610 sends the first query and first user identity to the host (715), which receives the information (720).

Host 630 stores the received first query and first user identity in a temporary database that includes other queries also associated with the user identity (725). In the present example, the query "Madonna Concert" may be stored in association with other queries provided by the user Madge-Fan, such as, for example, the queries "Madonna" and "Madonna Tickets." In some implementations, queries provided by the first user may be stored in the temporary database for a limited amount of time.

Host 630 determines that the queries associated with the user identity represent a query reformulation session (730). As described above, a set of queries may be determined to be related to one another as part of a query reformulation session if the queries have all been submitted by a user in order to identify information that satisfies a single information need of the user. For example, queries that are topically similar (e.g., are associated with the same subject matter) may be identified as being part of a query reformulation session. In the present example, because the queries "Madonna," "Madonna Tickets," and "Madonna Concerts" are topically similar, and were likely submitted by the user in order to satisfy the single information need of how to buy Madonna concert tickets, as described in more detail above, the three queries provided by the user MadgeFan may be determined to be part of a query reformulation session.

Once it is determined that a particular set of queries is part of a single query reformulation session, the host 630 generates a query reformulation path based on the query reformulation session (735). As also described above, a query reformulation path includes queries that have been determined to be topically related to one another being stored in the order that a user provided the queries to a search engine. In the present example, the query reformulation path generated by the host 630 includes, in order, the queries "Madonna," "Madonna Tickets," and "Madonna Concerts."

Additionally, and in some implementations, a query reformulation path may include "queries" that could have been (but were not actually) provided by the user in between two queries that were actually provided by the user. For example, even though the user MadgeFan only provided the queries "Madonna," "Madonna Tickets," and "Madonna Concerts," it may be automatically determined that the user could have provided the query "Madonna Concert Tickets" in between the "Madonna Tickets" and "Madonna Concerts" queries, and thus the query "Madonna Concert Tickets" may be inserted into the query reformulation path between the user-provided queries.

Host 630 stores the query reformulation path in a database, such as, for example, multiparty data store 100 of FIG. 1 (740). The query reformulation path may be stored by the client 610 in order to use the query reformulation path to assist a user who enters queries into a search engine that appear to be taking the user along a known query reformulation path. The user who is traversing the known query reformulation path may be a user other than the user who provided the queries used to generate the stored query reformulation path, or may be the same user whose queries were used to generate the stored query reformulation path. In the latter situation, the user may be able to receive search results that the user previously found useful, while avoiding intermediate steps that proved unnecessary or unhelpful. As described above, queries provided by MadgeFan may be stored in the multiparty data store 100 separate from queries provided by other users. In some implementations, the multiparty data store may include terms of each query, identification information of a user submitting the query, and the order in which the queries were received by the client 610, including, for example, date and time information.

Figure 8A:
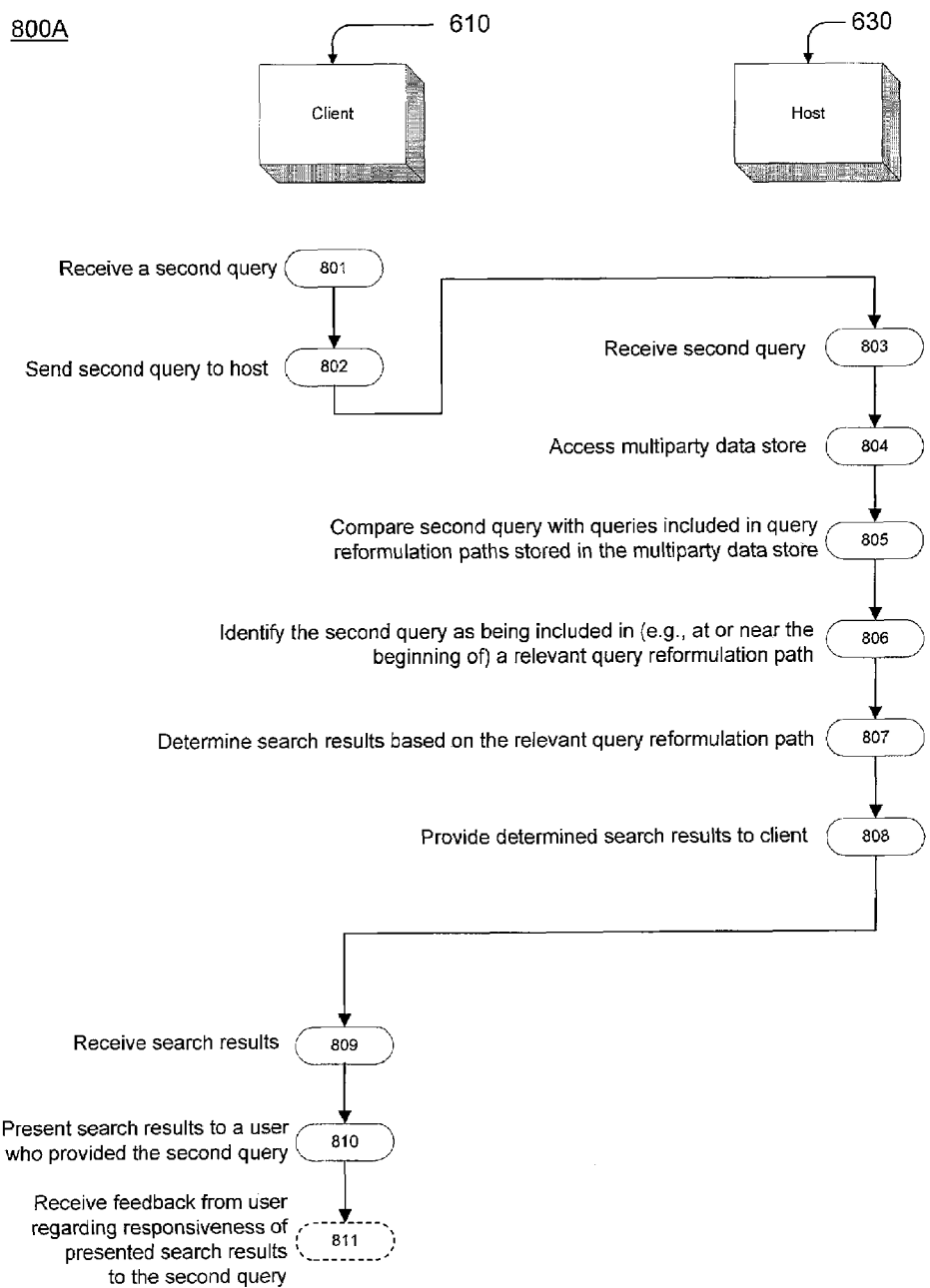
FIGS. 8A and 8B show an example of a flow chart of a process by which a user is provided with search results in response to entering a query.

A flow chart 800A of FIG. 8A shows a process by which a user is provided with search results in response to submitting a query. The search results may be provided to the user, for example, by the system described with respect to FIG. 6. For instance, the operations described with respect to flow chart 800A may be performed by the client 610 and the host 630 of FIG. 6.

At a point in time after the query reformulation path is generated in operation 740 of FIG. 7, client 610 receives a second query (801). For example, the second query is the query "Madonna." The client 610 sends the second query to the host 630 (802), and the host receives it (803).

The host 630 accesses the multiparty data store 100 of FIG. 1 (804). Accessing the multiparty data store 100 allows the host 630 access to previously generated and stored query reformulation paths. The host 630 compares the second query with queries included in the query reformulation paths stored in the multiparty data store 100 of FIG. 1 (805). For example, the host 630 compares the second query "Madonna" with queries included in more than one query reformulation path.

The host 630 identifies the second query as being included in a relevant query reformulation path (806). As described above, the query reformulation path generated by the host 630 in operation 735 of FIG. 7 includes, in order, the queries "Madonna," "Madonna Tickets," and "Madonna Concerts." As such, the query "Madonna," is included in this query reformulation path and the query reformulation path may be referred to as a relevant query reformulation path. More precisely, the host 630 determines if the second query is located at, or near, the starting point (i.e., beginning) of a relevant query reformulation path. By determining that the second query is at the beginning of a relevant query reformulation path, the host 630 can more accurately determine that the user who provided the second query is likely to provide other queries included in the middle, and towards the end point, of the relevant query reformulation path. This determination may indicate that the user who provided the second query may benefit from receipt of information (e.g., suggested queries or search results) based on queries included at, or near, the end point of the relevant query reformulation path.

The host 630 determines search results based on the relevant query reformulation path (807). More precisely, the host 630 identifies queries that are included in the query reformulation path at or near the end of the query reformulation path. Stated differently, the queries provided at the end of the query reformulation session are identified. For example, the query reformulation path generated by the host 630 in operation 735 of FIG. 7 includes, in order, the queries "Madonna," "Madonna Tickets," and "Madonna Concerts." Thus, the host 630 may identify the query "Madonna Concerts" as a query located at or near the end of a relevant query reformulation path. Additionally, or alternatively, the host 630 may identify queries that are included at any point along the query reformulation path. The queries to be identified may be referred to, for example, as a query located within the last 90% of a query reformulation path, a query that is located between a 3rd query and a 10th query within a query reformulation path, a query that is located within the first 10 queries in a query reformulation path, or a query having at least an 85% confidence rating—a confidence rating may be related to a percentage of users for which a particular query was helpful in general or more helpful than other queries in a query reformulation path.

Search results for the identified query (e.g., "Madonna Concerts") are determined using, for example, a search engine. The determined search results are provided to the client 610 (808) and the client 610 receives them (809).

The client 610 presents the search result to a user who provided the second query (810). For example, the client 610 provides the user with search results that have been determined for the query "Madonna Concerts."

The client 610 may, in some implementations, receive feedback from the user regarding the responsiveness of the presented search results to the second query (811). For example, by providing the second query "Madonna," the user may have been interested in retrieving information about the religious figure. Thus, the user may indicate to client 610 that the search results related to the query "Madonna Concerts," which were provided to the user during operation 810, are not relevant to the user's true information need.

In response, and in some implementations, the client 610 may identify one or more additional relevant query reformulation paths, which differ from the query reformulation path identified in operation 806 (e.g., a path that includes the queries "Madonna," "Mary," and "Joseph"). The client 610 then may (1) provide the user with the additional relevant query reformulation paths in their entirety, (2) provide the user with a portion (e.g., one or more queries) of the additional relevant query reformulation paths, or (3) provide the user with search results determined based on the queries included in the additional relevant query reformulation paths.

Figure 8B:
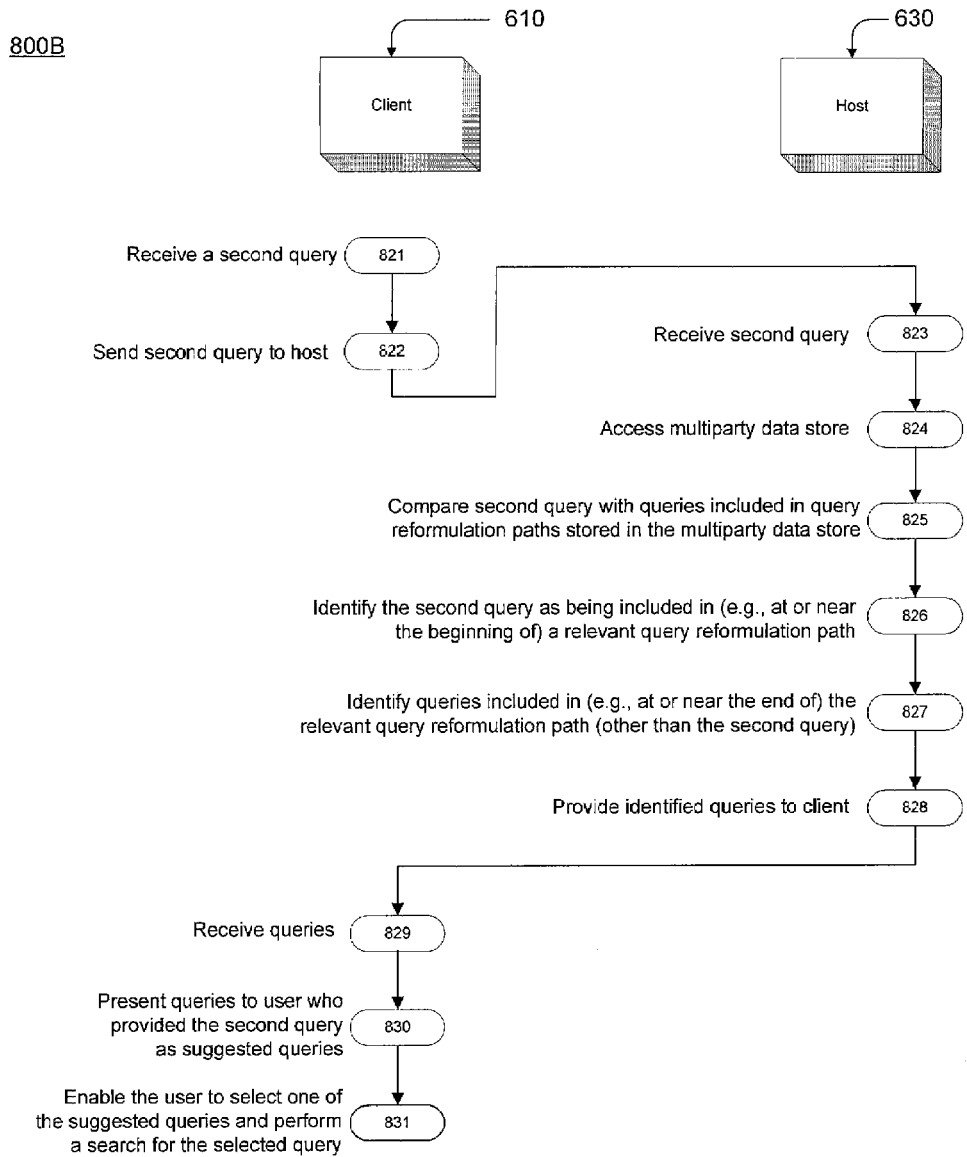

A flow chart 800B of FIG. 8B shows a process by which a user is provided with suggested queries in response to submitting a particular query. The suggested queries may be provided to the user, for example, by the system described with respect to FIG. 6. For instance, the process of flow chart 800B may be performed by the client 610 and the host 630 of FIG. 6.

As in the process of flow chart 800B of FIG. 8B, and as described above, the client 610 receives a second query (821) and sends the second query to the host 630 (822), which receives it (823). The host 630 accesses the multiparty data store 100 of FIG. 1 (824) and compares the second query with queries included in the query reformulation paths stored in the multiparty data store 100 of FIG. 1 (826). The host 630 identifies the second query as being included in (e.g., at or near the beginning of) a relevant query reformulation path (826).

The host 630 identifies one or more queries included in the relevant query reformulation path that differ from the second query (827). More precisely, the host 630 identifies queries included at or near the end of the relevant query reformulation path. For example, if the second query is "Madonna," and a relevant query reformulation path includes the queries, in order, "Madonna," "Madonna Tickets," and "Madonna Concerts," the host 630 may identify the query "Madonna Concerts" since it is located at the end of the query reformulation path and it differs from the second query "Madonna."

The host 630 provides the identified queries to the client 610 (828), which receives the identified queries (829). The client 610 presents the received queries to a user who provided the second query as suggested queries (830). For example, the client 610 may provide the user who provided the second query with a list of alternate queries (e.g., queries 221-224 of GUI 200 or queries 321-324 and 341-345 of GUI 300, or queries 421-427 of GUI 400) when the user enters a query that is deemed to be related to (e.g., is the starting point of) a query reformulation path to which the alternate query belongs.

The client 610 enables the user to select one of the suggested queries and perform a search for the selected query (831). For example, the user may select the suggested query "Madonna Concerts" and request a search on the query "Madonna Concerts" in order to receive search results responsive thereto.

Providing search results (as in flow chart 800A) or suggesting alternate queries, such as, for example, reformulated queries (as in flow chart 800B), based on a relevant query formulation path may address a user's information need so that the user retrieves search results that are responsive to the user's interest, even if the user is unable to articulate a query that leads to search results that are responsive to the user's predicted interest.

In some implementations, queries included in a dead-end or abandoned query reformulation session may not be stored as a query reformulation path. For example, a user may enter the query "fruit cake recipes," and then enter the query "holiday recipes." Search results may be provided to the user for each of these queries. The user may, or may not, review such search results provided in response to the "fruit cake recipe" query (e.g., the user may, or may not, click-through or select any of the search results provided in response to the "fruit cake recipe" query). Regarding the search results provided in response to the "holiday recipes" query, the user may not click-through any of the search results, or may only select a small number of the search results. The user then enters a completely unrelated query, such as, for example, "estate jewelry." The "fruit cake recipes" and "holiday recipes" queries seem topically related to one another and may be good candidates to be included in a query reformulation path. However, if the user does not return to this recipe query reformulation session within a threshold amount of time (e.g., 24 hours, a week, or a month), the query reformulation session may be determined to be abandoned. A query reformulation session may be abandoned because the user no longer needed the information the user was seeking, the user found the information in some other manner (e.g., a co-worker gave the user a photocopy of his personal fruit cake recipe), or the queries entered by the user did not provide satisfactory results (e.g., the queries resulted in a dead-end).

Other indicia that the user abandoned the query reformulation session (either for a loss of interest or due to a dead-end), include, for example, (1) a lack of selection of any search results provided in response to the "holiday recipes" query, (2) selection by the user of only a small number of the provided search results, (3) a relatively small dwell time on a web page referred to by a particular search result (determined based on an amount of time between queries entered by the user, an amount of time between the time the user left the search result page until the user returned to the search result page, or an amount of time a user spent at a web page referred to by a particular search result), or (4) entry of a completely unrelated query (e.g., a jump to another topic). If one or more of these indicia are present, the search engine may determine that the user lost interest in the query reformulation session (e.g., the session was abandoned) or that the search results provided in response to the last query provided during the query reformulation session were unsatisfactory to the user in that the search results did not satisfy the user's information need (e.g., the session dead-ended).

In either case, the query reformulation session was not successful, and therefore, storing the queries included in the query reformulation session as a query reformulation path would not be beneficial to other users who provide queries included in the query reformulation path. As such, the query reformulation session may be discarded. Additionally, or alternatively, the query reformulation session may be stored as a counter (e.g., negative) example of a query reformulation path, such that, for example, the query "holiday recipes" may be on a black list of queries that may not be provided to a user in response to the user entering the query "fruit cake recipes."

In some implementations, identity information for a user to whom a particular query reformulation path belongs (e.g., the user whose query reformulation session was the basis for creation of the query reformulation path) may be stored along with the query reformulation path. In this way, characteristics associated with the user to whom a query reformulation path belongs may be used to aid in providing a later user with search results based on the query reformulation path.

For example, User A is a doctor and many of the queries entered by User A are medical queries. Thus, User A may be referred to as an "expert" in the field of medicine. If User B, who is not a doctor, enters a medicine-related query, the query reformulation paths associated with User A may be weighted (as compared to query reformulation paths associated with non-doctor users) in providing search results (or suggested queries) to User B based on stored query reformulation paths. In this way, the expertise of User A may be used to help User B receive search results (or suggested queries) that are more likely to satisfy User B's medical information need.

In another example, one or more users may be associated with a particular topical interest group, such as, gardening. When a query entered by a user is determined to be related to the topic of gardening, query reformulation paths associated with those users who belong to the gardening interest group may be weighted when determining search results (or suggested queries) based on the query reformulation paths. Again, such weighting enables the user who entered the query to be provided with search results (or suggested queries) that are more likely to satisfy the user's interest in gardening information.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method comprising:
   receiving multiple series of queries;
   determining that each of the multiple series of queries were submitted by a user when seeking information that satisfies a single information need;
   determining that a starting point of each of the multiple series of queries is the same, the starting point being at least one query submitted chronologically before other queries included in the multiple series of queries;
   determining that an end point of at least some of the multiple series of queries differs, the end point being at least one query submitted chronologically after the at least one query representing the starting point;
   in response to determining that the starting point of each of the multiple series of queries is the same and that the ending point of at least some of the multiple series of queries differs:
   identifying a subset of end points of the multiple series of queries that excludes at least the end point found in a minimum number of the multiple series of queries; and
   generating a query reformulation path that associates the starting point with the subset of end points; and
   storing the generated query reformulation path to enable presentation of the subset of end points in response to receipt of the at least one query representing the starting point.

2. The method of claim 1 further comprising:
   accessing at least one second query reformulation path;
   comparing the query reformulation path with the at least one second query reformulation path;
   recognizing a pattern common to the query reformulation path and the at least one second query reformulation path; and
   generating a query reformulation pattern based on the recognized pattern.

3. The method of claim 2 wherein generating a query reformulation pattern includes generating a query reformulation pattern in which at least a portion of the query reformulation pattern is related to higher level semantics.

4. The method of claim 3 wherein the higher level semantics include a classification of at least one query within each of the query reformulation paths that were used to generate the query reformulation pattern, such that the query reformulation pattern is more generic than each of its component query reformulation paths.

5. The method of claim 1 wherein:
   identifying the subset of end points of the multiple series of queries that excludes at least the end point found in the minimum number of the multiple series of queries comprises identifying the end point found in a maximum number of the multiple series of queries;
   generating the query reformulation path that associates the starting point with the subset of end points comprises generating the query reformulation path that associates the starting point with the end point found in the maximum number of the multiple series of queries; and
   storing the generated query reformulation path to enable presentation of the subset of end points in response to receipt of the at least one query representing the staffing point comprises storing the generated query reformulation path to enable presentation of the end point found in the maximum number of the multiple series of queries in response to receipt of the at least one query representing the staffing point.

6. A computer-readable storage medium encoded with a computer program comprising instructions that, when executed, operate to cause a computer to perform operations comprising:

receiving multiple series of queries;

determining that each of the multiple series of queries were submitted by a user when seeking information that satisfies a single information need;

determining that a starting point of each of the multiple series of queries is the same, the starting point being at least one query submitted chronologically before other queries included in the multiple series of queries;

determining that an end point of at least some of the multiple series of queries differs, the end point being at least one query submitted chronologically after the at least one query representing the starting point;

in response to the determination that the starting point of each of the multiple series of queries is the same and the determination that the ending point of at least some of the multiple series of queries differs:

identifying a subset of end points of the multiple series of queries that excludes at least the end point found in a minimum number of the multiple series of queries; and generating a query reformulation path that associates the starting point with the subset of end points; and storing the generated query reformulation path to enable presentation of the subset of end points in response to receipt of the at least one query representing the starting point.

7. The computer-readable storage medium of claim 6 wherein the operations further comprise:

accessing at least one second query reformulation path:

comparing the query reformulation path with the at least one second query reformulation path:

recognizing a pattern common to the query reformulation path and the at least one second query reformulation path; and generating a query reformulation pattern based on the recognized pattern.

8. The computer-readable storage medium of claim 7 wherein generating a query reformulation pattern includes generating a query reformulation pattern in which at least a portion of the query reformulation pattern is related to higher level semantics.

9. The computer-readable storage medium of claim 8 wherein the higher level semantics include a classification of at least one query within each of the query reformulation paths that were used to generate the query reformulation pattern, such that the query reformulation pattern is more generic than each of its component query reformulation paths.

10. The computer-readable storage medium of claim 6 wherein:

identifying the subset of end points of the multiple series of queries that excludes at least the end point found in the minimum number of the multiple series of queries comprises identifying the end point found in a maximum number of the multiple series of queries;

generating the query reformulation path that associates the starting point with the subset of end points comprises generating the query reformulation path that associates the starting point with the end point found in the maximum number of the multiple series of queries; and storing the generated query reformulation path to enable presentation of the subset of end points in response to receipt of the at least one query representing the starting point comprises storing the generated query reformulation path to enable presentation of the end point found in the maximum number of the multiple series of queries in response to receipt of the at least one query representing the starting point.

11. A system comprising:

at least one computer; and at least one computer-readable medium coupled to the at least one computer having instructions stored thereon which, when executed by the at least one computer, cause the at least one computer to perform operations comprising:

receiving multiple series of queries:

determining that each of the multiple series of queries were submitted by a user when seeking information that satisfies a single information need;

determining that a starting point of each of the multiple series of queries is the same, the starting point being at least one query submitted chronologically before other queries included in the multiple series of queries;

determining that an end point of at least some of the multiple series of queries differs, the end point being at least one query submitted chronologically after the at least one query representing the starting point;

in response to the determination that the starting point of each of the multiple series of queries is the same and the determination that the ending point of at least some of the multiple series of queries differs:

identifying a subset of end points of the multiple series of queries that excludes at least the end point found in a minimum number of the multiple series of queries; and generating a query reformulation path that associates the starting point with the subset of end points; and storing the generated query reformulation path to enable presentation of the subset of end points in response to receipt of the at least one query representing the starting point.

12. The system of claim 11 wherein the operations further comprise:

accessing at least one second query reformulation path;

comparing the query reformulation path with the at least one second query reformulation path;

recognizing a pattern common to the query reformulation path and the at least one second query reformulation path; and generating a query reformulation pattern based on the recognized pattern.

13. The system of claim 12 wherein generating a query reformulation pattern includes generating a query reformulation pattern in which at least a portion of the query reformulation pattern is related to higher level semantics.

14. The system of claim 13 wherein the higher level semantics include a classification of at least one query within each of the query reformulation paths that were used to generate the query reformulation pattern, such that the query reformulation pattern is more generic than each of its component query reformulation paths.

15. The system of claim 11 wherein:

identifying the subset of end points of the multiple series of queries that excludes at least the end point found in the minimum number of the multiple series of queries comprises identifying the end point found in a maximum number of the multiple series of queries;

generating the query reformulation path that associates the starting point with the subset of end points comprises generating the query reformulation path that associates the starting point with the end point found in the maximum number of the multiple series of queries; and storing the generated query reformulation path to enable presentation of the subset of end points in response to receipt of the at least one query representing the starting point comprises storing the generated query reformulation path to enable presentation of the end point found in the maximum number of the multiple series of queries in response to receipt of the at least one query representing the starting point.

* * * * *